US009166250B2

(12) United States Patent
Katayama et al.

(10) Patent No.: US 9,166,250 B2
(45) Date of Patent: *Oct. 20, 2015

(54) SEPARATOR FOR BATTERY, METHOD FOR MANUFACTURING THE SAME, AND LITHIUM SECONDARY BATTERY

(75) Inventors: Hideaki Katayama, Osaka (JP); Eri Kojima, Osaka (JP); Shigeo Aoyama, Osaka (JP); Yoshinori Sato, Osaka (JP)

(73) Assignee: HITACHI MAXELL, LTD., Ibaraki-Shi, Osaka (JP)

( * ) Notice: Subject to any disclaimer, the term of this patent is extended or adjusted under 35 U.S.C. 154(b) by 431 days.

This patent is subject to a terminal disclaimer.

(21) Appl. No.: 12/439,803

(22) PCT Filed: Sep. 7, 2007

(86) PCT No.: PCT/JP2007/067528
§ 371 (c)(1),
(2), (4) Date: Mar. 3, 2009

(87) PCT Pub. No.: WO2008/029922
PCT Pub. Date: Mar. 13, 2008

(65) Prior Publication Data
US 2011/0003209 A1  Jan. 6, 2011

(30) Foreign Application Priority Data
Sep. 7, 2006  (JP) ................................. 2006-242301

(51) Int. Cl.
*H01M 2/16* (2006.01)
*H01M 10/052* (2010.01)
*H01M 10/0525* (2010.01)

(52) U.S. Cl.
CPC .......... *H01M 10/052* (2013.01); *H01M 2/1606* (2013.01); *H01M 2/1646* (2013.01); *H01M 2/1653* (2013.01); *H01M 10/0525* (2013.01); *Y02E 60/122* (2013.01)

(58) Field of Classification Search
CPC .................................................... H01M 2/1653
USPC .................................................. 429/251, 252
See application file for complete search history.

(56) References Cited

U.S. PATENT DOCUMENTS

| 3,351,495 | A | * | 11/1967 | Larsen et al. ................ 429/252 |
| 4,741,979 | A | | 5/1988 | Faust et al. |
| 6,153,337 | A | | 11/2000 | Carlson et al. |
| 6,200,706 | B1 | | 3/2001 | Ashida et al. |
| 6,287,720 | B1 | | 9/2001 | Yamashita et al. |
| 6,387,565 | B1 | | 5/2002 | Aihara et al. |
| 6,432,586 | B1 | | 8/2002 | Zhang |
| 6,447,958 | B1 | | 9/2002 | Shinohara et al. |
| 6,627,346 | B1 | | 9/2003 | Kinouchi et al. |
| 6,632,561 | B1 | | 10/2003 | Bauer et al. |
| 6,723,467 | B2 | | 4/2004 | Yoshida et al. |
| 6,811,928 | B2 | | 11/2004 | Aihara et al. |
| 7,662,517 | B2 | | 2/2010 | Lee et al. |
| 8,822,082 | B2 | * | 9/2014 | Katayama et al. ............ 429/251 |
| 2003/0036002 | A1 | | 2/2003 | Yoshida et al. |
| 2003/0087158 | A1 | | 5/2003 | Nakagawa et al. |
| 2003/0129379 | A1 | | 7/2003 | Yao et al. |
| 2004/0166297 | A1 | | 8/2004 | Yao et al. |
| 2004/0244675 | A1 | | 12/2004 | Kishimoto et al. |
| 2005/0031942 | A1 | | 2/2005 | Hennige et al. |
| 2005/0084761 | A1 | * | 4/2005 | Hennige et al. ............... 429/247 |
| 2005/0186479 | A1 | | 8/2005 | Totsuka et al. |
| 2005/0208383 | A1 | | 9/2005 | Totsuka et al. |
| 2005/0221165 | A1 | | 10/2005 | Hennige et al. |
| 2006/0008700 | A1 | * | 1/2006 | Yong et al. .................... 429/144 |
| 2006/0078791 | A1 | | 4/2006 | Hennige et al. |
| 2006/0134526 | A1 | | 6/2006 | Han et al. |
| 2006/0263693 | A1 | | 11/2006 | Kim et al. |
| 2006/0286446 | A1 | | 12/2006 | Chun et al. |
| 2007/0264577 | A1 | | 11/2007 | Katayama et al. |
| 2008/0138700 | A1 | | 6/2008 | Horpel et al. |

(Continued)

FOREIGN PATENT DOCUMENTS

EP  1184917 A2  3/2002
EP  1 359 632 A2  11/2003

(Continued)

OTHER PUBLICATIONS

Korea Institute of Science and Technology Information Report, "New functional resin using nano-complex (high performance nano-complex)", Nov. 2004.
Korean Office Action, dated Jun. 25, 2010, for Korean Application No. 10-2008-7016484.
US Office Action, dated Apr. 2, 2010, for U.S. Appl. No. 11/919,652.
US Office Action, dated Oct. 20, 2010, for U.S. Appl. No. 11/919,652.
US Office Action, dated Sep. 20, 2010, for U.S. Appl. No. 11/666,921.
Boehmite Mineral Data, Excalibur Mineral Company.
US Office Action, dated Apr. 6, 2011, for U.S. Appl. No. 11/866,921.
Japanese Office Action issued on Nov. 25, 2010 in corresponding Japanese Patent Application No. 2008-508014.
Office Action for corresponding Chinese Patent Application No. 2007800330936, issued on Mar. 12, 2012.

(Continued)

*Primary Examiner* — Stuart Hendrickson
(74) *Attorney, Agent, or Firm* — Birch, Stewart, Kolasch & Birch, LLP

(57) ABSTRACT

The separator for a battery according to the present invention is a separator for a battery including an insulator layer containing a fibrous material having a heat resistant temperature of equal to or higher than 150° C., insulating inorganic fine particles and a binder, or a separator for a battery including a porous layer formed of a thermal melting resin and an insulator layer containing insulating inorganic fine particles and a binder, wherein water content per unit volume is equal to or smaller than 1 mg/cm$^3$ when the separator is held for 24 hours in an atmosphere with a relative humidity of 60% at 20° C. The use of the separator for a battery according to the present invention makes it possible to provide a lithium secondary battery that has favorable reliability and safety and is excellent in storage characteristics and charge-discharge cycle characteristics.

29 Claims, 1 Drawing Sheet

(56) References Cited

U.S. PATENT DOCUMENTS

| | | |
|---|---|---|
| 2008/0248381 A1 | 10/2008 | Hennige et al. |
| 2009/0067119 A1 | 3/2009 | Katayama et al. |
| 2010/0015530 A1 | 1/2010 | Katayama et al. |

FOREIGN PATENT DOCUMENTS

| | | |
|---|---|---|
| JP | 60-136161 A | 7/1985 |
| JP | 1-258358 A | 10/1989 |
| JP | 2-86056 A | 3/1990 |
| JP | 4-340972 A | 11/1992 |
| JP | 5-74436 A | 3/1993 |
| JP | 5-335005 A | 12/1993 |
| JP | 8-287949 A | 11/1996 |
| JP | 9-134028 A | 5/1997 |
| JP | 9-259856 A | 10/1997 |
| JP | 11-40130 A | 2/1999 |
| JP | 11-185773 A | 7/1999 |
| JP | 2000-30686 A | 1/2000 |
| JP | 2000-48639 A | 2/2000 |
| JP | 2000-306568 A | 11/2000 |
| JP | 2000-348704 A | 12/2000 |
| JP | 2001-84987 A | 3/2001 |
| JP | 2001-93498 A | 4/2001 |
| JP | 2001-135295 A | 5/2001 |
| JP | 2001-266828 A | 9/2001 |
| JP | 2001-291503 A | 10/2001 |
| JP | 2001-527274 A | 12/2001 |
| JP | 2002-25531 A | 1/2002 |
| JP | 2002-42867 A | 2/2002 |
| JP | 2002-151040 A | 5/2002 |
| JP | 2002-166218 A | 6/2002 |
| JP | 2002-237332 A | 8/2002 |
| JP | 2002-541633 A | 12/2002 |
| JP | 2003-7279 A | 1/2003 |
| JP | 2003-22843 A | 1/2003 |
| JP | 2003-123728 A | 4/2003 |
| JP | 2003-206475 A | 7/2003 |
| JP | 2003-208924 A | 7/2003 |
| JP | 2003-317693 A | 11/2003 |
| JP | 2004-111157 A | 4/2004 |
| JP | 2004-241135 A | 8/2004 |
| JP | 2004-273282 A | 9/2004 |
| JP | 2004-288586 A | 10/2004 |
| JP | 2005-502177 A | 1/2005 |
| JP | 2005-302341 A | 10/2005 |
| JP | 2005-327633 A | 11/2005 |
| JP | 2005-339938 A | 12/2005 |
| JP | 2005-536858 A | 12/2005 |
| KR | 10-0470314 B1 | 2/2005 |
| WO | WO 00/60684 A1 | 10/2000 |
| WO | WO 2004/049471 A2 | 6/2004 |
| WO | WO-2005/038946 A3 | 4/2005 |
| WO | WO-2005/104269 A1 | 11/2005 |
| WO | WO-2006/062153 A1 | 6/2006 |
| WO | WO 2006/068428 A1 | 6/2006 |
| WO | WO-2007/066768 A1 | 6/2007 |

OTHER PUBLICATIONS

Japanese Office Action, dated Sep. 13, 2012, for Japanese Application No. 2008-124988.
Extended European Search Report, dated Feb. 21, 2012, for European Application No. 05814154.0.
Boehmite Mineral Data, Excalibur Mineral Company, Mar. 22, 2011.
US Office Action, dated Apr. 6, 2011, for U.S. Appl. No. 11/666,921.

* cited by examiner

SEPARATOR FOR BATTERY, METHOD FOR MANUFACTURING THE SAME, AND LITHIUM SECONDARY BATTERY

TECHNICAL FIELD

The present invention relates to a low-cost separator having an excellent dimensional stability at high temperatures, a method for manufacturing the same, and a lithium secondary battery that uses the same and is safe even in a high-temperature environment.

BACKGROUND ART

A lithium ion battery, which is a kind of nonaqueous battery, has been used widely as a power source of portable equipment such as a mobile phone and a notebook-sized personal computer, because of its high energy-density characteristic. With improvement in the performance of portable equipment, the capacity of the lithium ion battery tends to increase further, and thus securing safety has become important.

In a conventional lithium ion battery, a polyolefin-based porous film having a thickness of about 20 to 30 μm, for example, is used as a separator to be interposed between a positive electrode and a negative electrode. As the material for the separator, polyethylene having a low melting point sometimes is used for securing a so-called shutdown effect, namely, melting a resin forming the separator at or below a thermal runaway temperature of the battery so as to close the pores, thereby increasing the internal resistance of the battery and improving the safety of the battery at the time of short circuit or the like.

As the above-described separator, for example, a uniaxially-stretched or biaxially-stretched film is used in order to increase porosity and improve strength. Since such a separator is provided as a stand-alone film, a certain strength is required for the separator in view of workability or the like and secured by the above-mentioned stretching. However, since the crystallinity of the stretched film has increased, and the shutdown temperature has been raised to temperatures close to the thermal runaway temperature of the battery, the margin for securing the safety of the battery cannot be provided sufficiently.

Moreover, there occurs distortion in the film due to the stretching. Thus, when the film is exposed to high temperatures, shrinkage will occur due to residual stress. The shrinking temperature is very close to the melting point, that is, the shutdown temperature. As a result, in the case of using a polyolefin-based porous film separator, when the temperature of the battery reaches the shutdown temperature during anomalies in charging or the like, the electric current must be decreased immediately for preventing increase of the battery temperature. If the pores of the separator are not closed sufficiently and the electric current cannot be decreased immediately, the battery temperature will rise easily to the shrinking temperature of the separator, causing a risk of heat generation due to internal short circuit.

In order to prevent such a short circuit caused by the thermal shrinkage, a microporous film using a heat-resistant resin or a nonwoven fabric as a separator have been proposed. For example, Patent document 1 discloses a separator using a microporous film of wholly aromatic polyamide, and Patent document 2 discloses a separator using a polyimide porous film. Further, Patent document 3 discloses a separator using a polyamide nonwoven fabric, Patent document 4 discloses a separator including a base of a nonwoven fabric using aramid fibers, Patent document 5 discloses a separator using a polypropylene (PP) nonwoven fabric, and Patent document 6 discloses a technology regarding a separator using a polyester nonwoven fabric.

However, although the microporous films using the heat-resistant resins such as polyamide and polyimide have an excellent dimensional stability at high temperatures and can be made thinner, they are expensive. Also, the nonwoven fabrics using the heat-resistant fibers such as polyamide fibers and aramid fibers have an excellent dimensional stability but are expensive. The nonwoven fabrics using PP fibers or polyester fibers are inexpensive and excellent in dimensional stability at high temperatures. However, since the pore diameter is too large in the state of a nonwoven fabric, these nonwoven fabrics having a thickness of equal to or smaller than 30 μm, for example, cannot prevent the short circuit due to contact between the positive and negative electrodes or the short circuit due to the generation of lithium dendrites in a sufficient manner.

Furthermore, a technology has been proposed in which a nonwoven fabric or the like made of a low-cost material is used as a separator by various processings. For example, Patent document 7 discloses a separator obtained by filling a heat-resistant polybutylene terephthalate nonwoven fabric with polyethylene particles, alumina particles, etc., and Patent document 8 discloses a separator obtained by layering a heat-resistant separator layer formed principally of inorganic particles and a thermal-melting separator layer formed principally of organic particles such as polyethylene particles.

Patent document 1: JP 5(1993)-335005 A
Patent document 2: JP 2000-306568 A
Patent document 3: JP 9(1997)-259856 A
Patent document 4: JP 11(1999)-40130 A
Patent document 5: JP 2001-291503 A
Patent document 6: JP 2003-123728 A
Patent document 7: WO 2006/62153 A
Patent document 8: WO 2007/66768 A Now, lithium reacts vigorously with water. Therefore, in order to secure excellent properties and reliability of the lithium secondary battery, it is important to remove water from the battery as much as possible. Also, in the lithium secondary battery, when a slight amount of water is mixed inevitably in an organic electrolyte solution or water is adsorbed in other electrode materials, the reaction represented by the formula below occurs, thus generating a halogen acid such as hydrogen fluoride (HF).

$$2LiPF_6 + 12H_2O \rightarrow 12HF + 2LiP(OH)_6$$

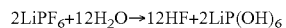

The hydrogen fluoride generated in the above reaction causes a problem of deteriorating materials constituting the battery such as a current collector and a positive active material and further degrading the battery performance. In such a battery whose constituent materials have been deteriorated, the internal resistance increases. Additionally, an aluminum foil is generally used as a positive current collector. When the positive current collector is corroded by hydrogen fluoride, eluted metal ions are deposited on the negative electrode, thus causing the deterioration of self-discharge characteristics. Moreover, water entrained into the battery sometimes generates not only the halogen acid such as hydrogen fluoride but also hydrogen. The hydrogen fluoride and hydrogen may cause battery swelling or a decrease in the charge-discharge cycle characteristics of the battery when the battery is stored in a high-temperature environment.

In the field of lithium secondary batteries, the recent dehydration technology is improved to achieve about 20 ppm or lower water content of an organic solvent. Further, the amounts of water contained in the positive electrode, the negative electrode and the separator also can be reduced by a decompression treatment down to 200 ppm or lower in terms of water content of the organic electrolyte solution when it is assumed that the water has moved into the organic electrolyte solution in the battery. For example, in a polyolefin-based porous film, which is a conventionally known separator, it is possible to remove water relatively easily by a decompression heat treatment at 100° C. or lower, thereby achieving the above-noted water content.

However, in the above-described conventional separator containing the inorganic particles and the organic particles, there has been a possibility of entraining unnecessary water in the battery unless the amount of water in the separator including the water contents of particles to be used and a binder used for adhesion is controlled strictly.

DISCLOSURE OF INVENTION

The present invention was made with the above-described situations in mind, and the object of the present invention is to provide a lithium secondary battery that has favorable reliability and safety and is excellent in storage characteristics and charge-discharge cycle characteristics, a separator that can constitute this lithium secondary battery, and a method for manufacturing this separator for the battery.

A first separator for a battery according to the present invention is a separator for a battery including an insulator layer containing a fibrous material having a heat resistant temperature of equal to or higher than 150° C., insulating inorganic fine particles, and a binder. Water content per unit volume is equal to or smaller than 1 mg/cm$^3$ when the separator is held for 24 hours in an atmosphere with a relative humidity of 60% at 20° C.

Also, a second separator for a battery according to the present invention is a separator for a battery including a porous layer formed of a thermal melting resin, and an insulator layer containing insulating inorganic fine particles and a binder. Water content per unit volume is equal to or smaller than 1 mg/cm$^3$ when the separator is held for 24 hours in an atmosphere with a relative humidity of 60% at 20° C.

Further, a first method for manufacturing a separator for a battery according to the present invention is a method for manufacturing a separator for a battery including an insulator layer containing a fibrous material having a heat resistant temperature of equal to or higher than 150° C., insulating inorganic fine particles and a binder. The method includes treating surfaces of the inorganic fine particles to be hydrophobic.

Moreover, a second method for manufacturing a separator for a battery according to the present invention is a method for manufacturing a separator for a battery including a porous layer formed of a thermal melting resin, and an insulator layer containing insulating inorganic fine particles and a binder. The method includes treating surfaces of the inorganic fine particles to be hydrophobic.

Additionally, a lithium secondary battery according to the present invention includes a negative electrode, a positive electrode, an organic electrolyte solution, and the above-described first or second separator for a battery according to the present invention.

Further, a third method for manufacturing a separator for a battery according to the present invention is a method for manufacturing a separator for a battery including an insulator layer containing a fibrous material having a heat resistant temperature of equal to or higher than 150° C., insulating inorganic fine particles and a binder, and includes preparing a liquid composition by dispersing the inorganic fine particles and an emulsion containing a surfactant and the binder in a solvent, and removing the surfactant.

Moreover, a fourth method for manufacturing a separator for a battery according to the present invention is a method for manufacturing a separator for a battery including a porous layer formed of a thermal melting resin, and an insulator layer containing insulating inorganic fine particles and a binder, and includes preparing a liquid composition by dispersing the inorganic fine particles and an emulsion containing a surfactant and the binder in a solvent, and removing the surfactant.

Furthermore, the present invention also includes a lithium secondary battery including a negative electrode, a positive electrode, an organic electrolyte solution, and a separator for a battery, wherein the separator includes an insulator layer containing a fibrous material having a heat resistant temperature of equal to or higher than 150° C., insulating inorganic fine particles, and a binder, and a total water concentration of the organic electrolyte solution is equal to or lower than 500 ppm.

In addition, the present invention also includes a lithium secondary battery including a negative electrode, a positive electrode, an organic electrolyte solution, and a separator for a battery, wherein the separator includes a porous layer formed of a thermal melting resin, and an insulator layer containing insulating inorganic fine particles and a binder, and a total water concentration of the organic electrolyte solution is equal to or lower than 500 ppm.

In accordance with the present invention, it is possible to provide a lithium secondary battery that has favorable reliability and safety and is excellent in storage characteristics and charge-discharge cycle characteristics, a separator that can constitute this lithium secondary battery, and a method for manufacturing this separator for the battery.

DESCRIPTION OF THE INVENTION

Figure 1:
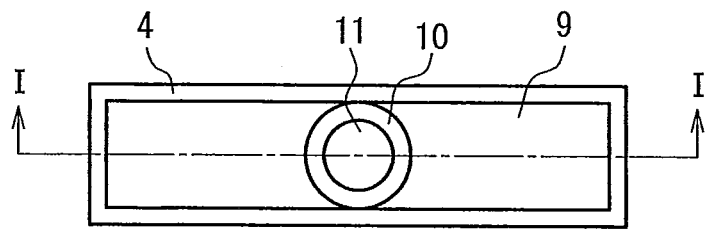
FIG. 1 is a plan view schematically showing a rectangular lithium secondary battery serving as an example of a lithium secondary battery according to the present invention.

When a separator for a battery according to the present invention in the following, sometimes referred to simply as a "separator") is held for 24 hours in an atmosphere with a relative humidity of 60% at 20° C., the water content per unit volume is equal to or smaller than 1 mg/cm$^3$ and preferably equal to or smaller than 0.5 mg/cm$^3$.

If a large amount of water is present in a lithium secondary battery, gases such as hydrogen fluoride and hydrogen generated from water sometimes cause battery swelling during a high-temperature storage of the battery. Also, the above-noted gases cause the heterogeneous charge-discharge reaction on the surface of the electrode and the current concentration locally, so that minute lithium dendrites are deposited on the electrode. Consequently, the battery short circuit slightly occurs resulting in loss of battery reliability or poor charge-discharge cycle characteristics.

However, with the separator whose water content per unit volume satisfies the above-mentioned specific value when the separator is held in the specific environment described above, the amount of water entrained into a lithium secondary battery using this separator can be reduced easily, thus making it possible to enhance the storage characteristics, the reliability and the charge-discharge cycle characteristics of the battery.

It should be noted that smaller water content in the separator (the-content of water per unit volume when the separator is held for 24 hours in an atmosphere with a relative humidity of 60% at 20° C.) is more preferable as mentioned above, and a content of 0 mg/cm$^3$ is most preferable. However it is difficult to achieve the content, so the lower limit of the water content is usually about 0.1 mg/cm$^3$.

The water content in the separator can be measured by the following method, for example. A measurement sample is placed in a heating furnace at 150° C. in which a nitrogen gas is flowed, and held for 1 minute. Then, the nitrogen gas that has been flowed is introduced in a measurement cell of a Karl Fischer moisture meter, where the water content is measured. An integrated value to the end point of titration is the amount of contained water. The water content is measured in a glove box with a dew point of −60° C. The content of water per unit volume of the separator is calculated by dividing the above-described measured value by an apparent volume of the sample. Here, the apparent volume of the sample is a volume including pores inside the separator and a value obtained by the product of the area and thickness of the sample.

The first separator according to the present invention has an insulator layer containing a fibrous material (A) having a heat resistant temperature of equal to or higher than 150° C., insulating inorganic fine particles (B), and a binder (C). Alternatively, the second separator according to the present invention has a porous layer formed of a thermal melting resin (E), and an insulator layer containing insulating inorganic fine particles (B) and a binder (C).

According to the present invention, it is possible to reduce the above-described water content in the separator, by controlling the hydrophobicity of the separator with the insulating inorganic fine particles (B) or the binder (C), in particular.

In the present invention, the fibrous material (A) principally forming the separator has a heat resistant temperature of equal to or higher than 150° C. Accordingly, in the case where a function in which part of the other constituent materials of the separator melt at about 130° C., for example, close the pores of the separator and block the transfer of ions in the separator (a so-called shutdown function) is exhibited even if the temperature of the separator rises further by 20° C. or greater, the shape of the insulator layer containing the fibrous material (A), the insulating inorganic fine particles (B) and the binder (C) is kept stable, thus preventing the short circuit. Consequently, it is possible to maintain the reliability and safety at the time of abnormal heating of the battery.

Also, in the case where the porous layer formed of the thermal melting resin (E) such as polyethylene is provided, since the insulator layer formed of the inorganic fine particles (B) and the binder (C) prevents the short circuit in the battery, it is possible to maintain the reliability and safety at the time of abnormal heating of the battery similarly to the above even when the above-noted porous layer is thin or even when a conventional PE porous film is used as the above-noted porous layer.

As described above, in accordance with the present invention, the short circuit due to the heat shrinkage of the separator at high temperatures can be prevented with a configuration other than a thicker separator, for example. Therefore, the separator according to the present invention can be made relatively thinner, and it also is possible to suppress the reduction of the energy density of the battery using this separator in a quickest possible manner.

The "heat resistant temperature of equal to or higher than 150° C." in the fibrous material in the present invention refers to a property that substantially no deformation occurs at 150° C. and, more specifically, a property that no heat shrinkage is recognized when the fibrous material heated to 150° C. is observed visually.

The fibrous material (A) is not particularly limited as long as it has a heat resistant temperature of equal to or higher than 150° C., an electric insulation and an electrochemical stability and further is stable toward an organic electrolyte solution, which will be detailed later (in the following, sometimes abbreviated as an "electrolyte solution"), and a solvent used for a liquid composition containing the insulating inorganic fine particles (B) used at the time of manufacturing a separator (described in detail later). It should be noted that the "fibrous material" in the present invention refers to a material having an aspect ratio [longitudinal length/width (diameter) in a direction perpendicular to the longitudinal direction] of at least 4. It is preferable that the fibrous material (A) according to the present invention has an aspect ratio of at least 10.

Specific constituent materials for the fibrous material (A) can be, for example, resins such as cellulose, modified cellulose (carboxymethyl cellulose, etc.), polypropylene (PP), polyester [polyethylene terephthalate (PET), polyethylene naphthalate (PEN), polybutylene terephthalate (PBT), etc.], polyacrylonitrile (PAN), aramid, polyamide imide and polyimide; and inorganic materials (inorganic oxides) such as glass, alumina and silica. The fibrous material (A) may contain one kind or two or more kinds of these constituent materials. Further, the fibrous material (A) may contain not only the above-mentioned constituent materials but also various known additives (for example, an antioxidant or the like in the case of a resin) as a constituent component, as necessary.

The diameter of the fibrous material (A) is appropriate as long as it is equal to or smaller than the thickness of the separator, and preferably is 0.01 to 5 µm, for example. An excessively large diameter leads to insufficient entanglement of the fibrous materials, reducing the strength of a sheet-like material formed thereof, which in turn is the strength of the separator, so that the handling becomes difficult in some cases. Also, an excessively small diameter results in excessively small pores in the separator, so that the ion permeability tends to decrease, leading to poor rate performance of the battery in some cases.

It is desired that the amount of the fibrous material (A) contained in the separator according to the present invention is equal to or larger than 10% by volume, more preferably equal to or larger than 30% by volume, and is equal to or smaller than 90% by volume, more preferably equal to or smaller than 70% by volume, for example, in a total volume of the constituent components of the separator. The fibrous material (A) is present in the separator (the sheet-like material) such that a major axis (a longitudinal axis) of the fibrous material (A) and a separator surface form an average angle of preferably equal to or smaller than 30° and more preferably equal to or smaller than 20°, for example. By enhancing the in-plane orientation so that the average angle of the fibrous material (A) to the separator film surface is equal to or smaller than 30°, the fibrous material (A) achieves a larger effect of improving the strength of the separator. By setting the average angle to equal to or smaller than 20°, a further effect can be expected.

In the separator according to the present invention, the insulating inorganic fine particles (B) [in the following, simply referred to as "inorganic fine particles (B)"] have an effect of filling gaps formed between the fibrous materials (A) so as to suppress the short circuit due to lithium dendrites. The inorganic fine particles (B) are not particularly limited as long as they have an electric insulation and an electrochemical stability, are stable toward an electrolyte solution, which will be detailed later, and a solvent used for a liquid composition used at the time of manufacturing a separator and are not dissolved in the electrolyte solution in a high-temperature state. The "high-temperature state" in the instant description specifically refers to temperatures equal to or higher than 150° C., and the inorganic fine particles (B) are appropriate as long as they are stable particles that are not deformed and do not undergo any change in chemical composition in the electrolyte solution at these temperatures. Further, having "an electrochemical stability" in the instant description refers to undergoing no chemical change at the time of charging and discharging of the battery.

Specific examples of such inorganic fine particles (B) (inorganic powder) can include oxide fine particles such as iron oxide, $SiO_2$, $Al_2O_3$, $TiO_2$, $BaTiO_2$ and ZrO; nitride fine particles such as aluminum nitride and silicon nitride; hardly-soluble ionic crystal fine particles such as calcium fluoride, barium fluoride and barium sulfate; covalent crystal fine particles such as silicon and diamond; clay fine particles such as talc and montmorillonite; and substances derived from mineral resources such as boehmite, zeolite, apatite, kaoline, mullite, spinel, olivine, sericite and bentonite and artificial substances thereof. The inorganic fine particles (B) may be fine particles provided with an electric insulation by treating surfaces of electrically conductive fine particles, for example, metal fine particles; oxide fine particles such as $SnO_2$ or indium-tin oxide (ITO); carbonaceous fine particles such as carbon black or graphite with a material having an electric insulation (for example, a material forming the electrically insulating inorganic fine particles or a material forming an organic fine particles, which will be described later). The inorganic fine particles (B) may be one kind or a combination of two or more kinds of the above.

The inorganic fine particles (B) may be in any of a spherical form, a substantially spherical form, a plate form and the like, and preferably contain plate-like particles. The plate-like particles can be various commercially available products, for example, "SUNLOVELY" ($SiO_2$) manufactured by AGC Si-Tech Co., Ltd., a pulverized product of "NST-B1" ($TiO_2$) manufactured by ISHIHARASANGYO KAISHA LTD., plate-like barium sulfate "H Series" and "HL Series" manufactured by Sakai Chemical Industry Co., Ltd., "MICRON WHITE" (talc) manufactured by Hayashi Kasei Co., Ltd., "BEN-GEL" (bentonite) manufactured by Hayashi Kasei Co., Ltd., "BMM" and "BMT" (boehmite) manufactured by Kawai Lime Industrial, Co., Ltd., "CELASULE BMT-B" [alumina ($Al_2O_3$)] manufactured by Kawai Lime Industrial, Co., Ltd., "SERATH" (alumina) manufactured by KINSEI MATEC CO., LTD., "HIKAWA MICA Z-20" (sericite) available from Hikawa Kogyo Co., Ltd. and the like. Other than the above, $SiO_2$, $Al_2O_3$, ZrO and $CeO_2$ can be produced by a method disclosed in JP 2003-206475 A.

When the inorganic fine particles (B) have a plate form, it is possible to suppress the short circuit in a more favorable manner by orienting the inorganic fine particles (B) in the separator so that their flat surfaces are substantially in parallel with the separator surface. This is assumed to be because, by orienting the inorganic fine particles (B) as above, the inorganic fine particles (B) are arranged such that their flat surfaces partially overlap each other, so that the pores (through holes) extending from one surface to the other surface of the separator are formed not linearly but windingly, which can prevent the lithium dendrites from passing through the separator, resulting in the more favorable suppression of the short circuit.

In the case where the inorganic fine particles (B) are in a plate form, it is desired that the aspect ratio (the maximum length in the plate-like particle/the thickness of the plate-like particle) is, for example, at least 5, more preferably at least 10, and not greater than 100, more preferably not greater than 50. Also, it is desired that the average ratio of the length of the flat surface of the particle along the major axis to the length thereof along the minor axis (the major axis length/the minor axis length) is not greater than 3 and, more preferably not greater than 2. The separator prevents the short circuit more effectively when the plate-like inorganic fine particles (B) have the aspect ratio and the average ratio of the major axis length to the minor axis length of the flat surface described above.

The above-noted average ratio of the major axis length to the minor axis length of the flat surface in the case where the inorganic fine particles (B) have a plate form can be calculated by, for example, analyzing an image captured with a scanning electron microscope (SEM). Further, the above-noted aspect ratio in the case where the inorganic fine particles (B) have a plate form can also be calculated by analyzing an image captured with the SEM.

In addition, the inorganic fine particles (B) may be particles containing at least two kinds of materials constituting the various inorganic fine particles illustrated above (inorganic materials).

The separator according to the present invention can achieve the above-noted specific water content by controlling the hydrophobicity of the separator using the inorganic fine particles (B) or the binder (C) described later. For controlling the hydrophobicity of the separator by using the inorganic fine particles (B), it is preferable to treat the surfaces of the inorganic fine particles illustrated above to be hydrophobic. On the other hand, when controlling the hydrophobicity of the separator by using the binder (C) (which will be described in detail later), the inorganic fine particles illustrated above whose surfaces are not treated to be hydrophobic may be used as the inorganic fine particles (B). However, it is more preferable to treat the surfaces of the inorganic fine particles illustrated above to be hydrophobic.

The method for treating the surfaces of the inorganic fine particles (B) to be hydrophobic can be, for example, a method of treating the surfaces of the inorganic fine particles using at least one kind of a surface reforming agent selected from the group consisting of silazane, a silane coupling agent, a silicone oil, a titanate coupling agent, an aluminate coupling agent and a zirconate coupling agent, for example. These surface reforming agents are known as a surface reforming agent for treating a toner to be hydrophobic, and have, for example, an effect of forming a covalent bond with hydroxyl groups on the surfaces of the inorganic fine particles in the presence of water by hydrolysis of alkoxy groups of the surface reforming agent, thereby lowering the hydrophilicity of the surfaces of the inorganic fine particles, namely, making them hydrophobic.

It is preferable that a functional group (side chain functional group) contained in a molecule of the above-noted surface reforming agent is selected suitably in accordance with the kinds of the inorganic fine particles to be treated and the system in which the particles are treated to be hydrophobic (a solvent to be used, etc.). More specifically, it is possible to use a surface reforming agent having a functional group such as an amino group, an epoxy group, a vinyl group, a sulfide group, a chloro group, a fluoro group, a phenyl group, a phenoxyl group, an alkyl group or an alkoxy group. The number of carbon atoms of the alkyl group is preferably selected from 1 (a methyl group) to 10 (a decyl group).

The treatment of the particles to be hydrophobic using the surface reforming agent described above can be carried out by a dry method in which the surface reforming agent is jetted directly or a solution obtained by diluting the surface reforming agent in a solvent is jetted with dry air or a nitrogen gas toward the inorganic fine particles that are stirred forcibly; a wet method in which the inorganic fine particles are dispersed in water to obtain a slurry, the surface reforming agent is added directly or a solution obtained by diluting the surface reforming agent in a solvent is added to the slurry and stirred, followed by precipitation and drying; or the like.

In the case of the wet method, it is preferable that pH in the system is adjusted to 3 to 4, for example. Also, in the case of the wet method, the binder or other materials may be added to the slurry containing the inorganic fine particles and the surface reforming agent, thus treating the inorganic fine particles to be hydrophobic at the same time with producing the separator. Further, in order to enhance the reactivity between the inorganic fine particles and the surface reforming agent, the inorganic fine particles may be activated.

It is preferable that the amount of the surface reforming agent to be used is, for example, 0.2% to 2% by mass with respect to the total mass of the surface reforming agent and the inorganic fine particles.

Moreover, in both of the cases of the dry method and the wet method described above, the inorganic fine particles are preferably dried, more preferably are dried in an inert atmosphere or under a reduced pressure. Incidentally, although the drying temperature can be set to be equal to or lower than the heat resistant temperature of the treated inorganic fine particles (B) when performing only the treatment of the surfaces of the inorganic fine particles to be hydrophobic among the dry method and the wet method described above, it is preferable that the drying temperature is equal to or lower than the heat resistant temperature of each of the constituent materials of the separator when performing the treatment of the inorganic fine particles to be hydrophobic at the same time with the formation of the separator in the wet method.

Further, in the case of using specific inorganic fine particles such as silica, alumina or boehmite, it is possible to make the surfaces hydrophobic by a heat treatment. The hydrophobicity of these inorganic fine particles can be raised by the heat treatment (burning) at 300° C. to 1000° C., more preferably 500° C. to 1000° C., for example, to remove water adsorbed on the surfaces and dehydrate hydroxyl groups present on the surfaces.

Moreover, the inorganic fine particles whose surfaces have been treated to be hydrophobic by the above-described heat treatment may be treated to be hydrophobic further by the above-described method using the surface reforming agent. In this case, it also is possible to adopt a spraying method in which the surface reforming agent is sprayed directly or a solution obtained by diluting the surface reforming agent in a solvent is sprayed on the inorganic fine particles that have been just taken out from a heat treatment furnace, for example.

Although the diameter of the inorganic fine particles (B) in a dry state is appropriate as long as it is smaller than the thickness of the separator, the average particle diameter preferably is smaller than the thickness of the separator and larger than $1/100$ of the thickness of the separator. More specifically, it is desired that the average particle diameter is at least 0.01 µm, and more preferably is at least 0.1 µm. By setting the average particle diameter of the inorganic fine particles (B) to the above-noted specific values, the gap between the particles (B) can be increased to a certain extent so as to shorten the conduction path of ions in the separator, thereby enhancing the battery performances. It should be noted that excessively large inorganic fine particles (B) bring about excessively large gaps between the particles (B), so that the effect of preventing short circuit caused by the generation of lithium dendrites is reduced in some cases. Therefore, the average particle diameter of the inorganic fine particles (B) preferably is not greater than 10 µm, and more preferably is not greater than 5 µm.

Here, the average particle diameter of the inorganic fine particles (B) described above and the average particle diameters of fine particles of a swelling resin (D) and fine particles of a thermal melting resin (E) described later are determined as a number-average particle diameter measured by using a laser scattering particle size distribution meter ("LA-920" manufactured by HORIBA) after dispersing them in a medium in which the resin (D) does not swell (for example, water).

It is desired that the content of the inorganic fine particles (B) in the separator according to the present invention is at least 20% by volume, more preferably at least 40% by volume, and not greater than 70% by volume, more preferably not greater than 60% by volume in the total volume of the constituent components of the separator.

In the separator according to the present invention, the binder (C) is used for the purpose of binding the fibrous materials (A) together to obtain a sheet-like material or binding the sheet-like material formed of the fibrous material (A) and the inorganic fine particles (B) or other fine particles of resins [the swelling resin (D), the thermal melting resin (E), etc., which will be described later].

The binder (C) is appropriate as long as it has an electrochemical stability, is stable toward an electrolyte solution and further can allow adhesion of the fibrous material (A), the inorganic fine particles (B) or other particles in a favorable manner. For example, it is possible to use an ethylene-vinyl acetate copolymer (EVA) with a structural unit derived from vinyl acetate of 20 to 35 mol %, an ethylene-acrylate copolymer such as an ethylene-ethylacrylate copolymer, a crosslinked substance of polyacrylate, a fluorine based rubber, a styrene butadiene rubber (SBR), carboxymethyl cellulose (CMC), hydroxyethyl cellulose (HEC), polyvinyl alcohol (PVA), polyvinyl butyral (PVB), polyvinyl pyrrolidone (PVP), polyurethane, an epoxy resin, etc., and they may be used alone or in combination of two or more. Incidentally, when such a binder (C) is used, it can be used in an emulsion form obtained by dissolving or dispersing the binder (C) in a solvent of a liquid composition for forming a separator described later.

Further, for example, in the case where the swelling resin (D) or the thermal melting fine particles (E) described later has an adhesive property by itself, it can serve also as the binder (C). Thus, among the swelling resin (D) and the thermal melting fine particles (E) described later, those having an adhesive property by themselves also are included in the binder (C).

It should be noted that the ethylene-acrylate copolymer (ethylene-ethylacrylate copolymer or the like), the crosslinked substance of polyacrylate and SBR among the binder (C) generally are supplied in an emulsion form in which the binder is dispersed in a liquid using a surfactant. When a separator is produced using such a binder (C), the surfactant in the binder (C) also is taken in the separator. Since the surfactant easily adsorbs water, the water content in the separator may increase.

Accordingly, in the case of using the binder (C) illustrated above that is supplied generally in an emulsion form, it also is possible to control the hydrophobicity of the separator by removing the surfactant in the binder (C), so that the specific water content noted above can be secured.

In order to remove the surfactant from the binder (C), a method of heat-treating the binder (C) is adopted preferably. If an attempt is made to remove the surfactant by heat-treating the binder (C) before it is used for separator production, the binder (C) cannot be in the emulsion form any longer, so that the separator production may become difficult. Therefore, it is preferable that the heat treatment for removing the surfactant from the binder (C) is carried out after the binder (C) is formed into the separator. The heat treatment method will be described in detail later.

Moreover, in order to provide the separator with the shutdown function, it also is possible to add fine particles of the swelling resin (D) that can swell in the electrolyte solution and whose swelling degree rises with a temperature increase or fine particles of the thermal melting resin (E) that melts at 80° C. to 140° C. Also, both of the swelling resin (D) and the thermal melting resin (E) may be added to the separator, or a composite material of them may be added.

The above-described shutdown function of the separator in the case of using the swelling resin (D) and the thermal melting resin (E) can be evaluated by, for example, a resistance increase with the temperature of a model cell. In other words, a model cell including a positive electrode, a negative electrode, a separator and an electrolyte solution is produced and retained in a high-temperature vessel, and the internal resistance of this model cell is measured while heating the high-temperature vessel at 5° C./minute. Then, the temperature at which the measured internal resistance reaches at least 5 times as high as the internal resistance before heating (the resistance measured at room temperature) is determined, whereby this temperature can be evaluated as the shutdown temperature of the separator. In the separator using the swelling resin (D) and the thermal melting resin (E), the shutdown temperature evaluated in this manner can be set to about 130° C. Accordingly, a sufficient ion conductivity is secured in a usual use environment of the battery so as to achieve favorable discharge characteristics of the battery, while the shutdown occurs at a relatively early stage in the case where the temperature inside the battery increases, and the battery safety thus is secured.

When a battery including a separator using the swelling resin (D) that can swell in an organic electrolyte solution and whose swelling degree rises with a temperature increase is exposed to high temperatures, the swelling resin (D) absorbs the electrolyte solution in the battery and swells due to the property of the swelling resin (D) that its swelling degree rises with a temperature increase (in the following, sometimes referred to as a "thermal swelling property"). At this time, a so-called "lack of solution" state in which the amount of the electrolyte solution present inside the pores in the separator becomes scarce occurs, and the swollen particles close the pores inside the separator. Consequently, the lithium-ion conductivity in the battery decreases considerably, so that the internal resistance of the battery rises, thus making it possible to secure the above-noted shutdown function.

The swelling resin (D) preferably exhibits the above-mentioned thermal swelling property at 75° C. to 125° C. If the temperature at which the thermal swelling property is exhibited is too high, it is not possible to suppress the thermal runaway reaction of the active material in the battery sufficiently, so that the safety enhancement effect of the battery sometimes cannot be secured sufficiently. Also, if the temperature at which the thermal swelling property is exhibited is too low, the lithium-ion conductivity in the battery is too low in a usual use temperature range, posing problems to the use of equipment in some cases. In other words, in the case of providing the separator according to the present invention with the shutdown function, it is desired that the temperature at which the conductivity of lithium ions in the battery decreases considerably (a so-called shutdown temperature) is set to range from about 80° C. to about 130° C. as described above, and thus, the temperature at which the swelling resin (D) starts exhibiting the thermal swelling property due to the temperature increase preferably ranges from 75° C. to 125° C.

Specific examples of the constituent material of the swelling resin (D) can include polystyrene (PS), an acrylic resin, a styrene-acrylic resin, polyalkylene oxide, a fluorocarbon resin, a styrene-butadiene rubber (SBR), derivatives thereof, cross-linked substances thereof; a urea resin; polyurethane; and the like. The swelling resin (D) may contain one kind of the above-listed resins alone or contain two or more kinds thereof. Also, the swelling resin (D) may contain not only the above-noted constituent materials but also various known additives to be added to resins (for example, an antioxidant or the like), as necessary.

For instance, when the swelling resin (D) is formed of the cross-linked resins illustrated above, the volume changes reversibly with temperature variation, for example, even if the resins once swell due to a temperature increase, they shrink again with a temperature decrease. Also, these cross-linked resins are stable up to temperatures higher than the thermal swelling temperature in a so-called dry state in which no electrolyte solution is contained. Thus, in the separator using the swelling resin (D) constituting the above-noted cross-linked resins, the thermal swelling property of the swelling resin (D) is not impaired even after heating processes such as drying of the separator and drying of an electrode group at the time of producing the battery, so that handling in these heating processes becomes easier. Further, with the above-mentioned reversibility, even if the shutdown function is once effected due to a temperature increase, it still is possible to make the separator function again as long as the safety can be secured owing to the temperature decrease inside the battery.

Among the constituent materials illustrated above, cross-linked PS, cross-linked acrylic resin [for example, cross-linked polymethyl methacrylate (PMMA)] and cross-linked fluorocarbon resin [for example, cross-linked polyvinylidene fluoride (PVDF)] are preferable, and cross-linked PMMA is particularly preferable.

Although a detailed mechanism by which these swelling resins (D) swell with the temperature increase has not been clear, a mechanism is considered by which, in the case where a glass transition temperature (Tg) of PMMA principally forming cross-linked PMMA particles is in the vicinity of 100° C., the cross-linked PIMA/IA particles become flexible in the vicinity of Tg of PMMA, absorb more electrolyte solution and swell, for example. Accordingly, it is considered that Tg of the swelling resin (D) desirably ranges from about 75° C. to about 125° C.

Further, the swelling resin (D) can be particles obtained by chemically bonding a resin to heat resistant fine particles such as inorganic fine particles or organic fine particles, more specifically, compound particles of a core-shell structure in which inorganic fine particles or organic fine particles that are stable toward an electrolyte solution serve as a core and the above-noted resin capable of constituting the swelling resin (D) serves as a shell.

The heat resistant fine particles that can serve as the core of the swelling resin (D) of the core-shell structure can be inorganic fine particles or organic fine particles that do not undergo any change such as chemical change or thermal deformation and can be present stably when exposed to high temperatures equal to or higher than 150° C. in an organic electrolyte solution. Among them, the inorganic fine particles can be the above-mentioned various inorganic fine particles illustrated for the inorganic fine particles (B). Also, the organic fine particles can be particles formed of various polymers such as polyimide, a melamine-based resin, a phenol-based resin, cross-linked PMMA, cross-linked PS, polydivinylbenzene (PDVB), benzoguanamine-formaldehyde condensate [except those usable for the swelling resin (D)]. The polymer constituting these particles may be a mixture, a modified form, a derivative, a random copolymer, an alternating copolymer, a graft copolymer or a block copolymer, and the above-noted polymer may be a cross-linked substance or not.

As the swelling resin (D) of the core-shell structure as described above, it is possible to use particles obtained by polymerizing styrene or an acrylic monomer [(meth)acrylate, methyl(meth)acrylate or the like] in the presence of heat resistant fine particles whose surfaces have been treated with a silane coupling agent or the like, for example.

Although the particle diameter of the swelling resin (D) in a dry state is appropriate as long as it is smaller than the thickness of the separator, the average particle diameter preferably is 1/3 to 1/100 of the thickness of the separator. More specifically, the average particle diameter preferably is at least 0.001 µm, and more preferably is at least 0.1 µm. By setting the average particle diameter of the swelling resin (D) to the above-noted specific values, the gap between the particles (D) and the gap between the particles (D) and other particles [the inorganic fine particles (B), etc.] can be increased to a certain extent so as to shorten the conduction path of ions in the separator, thereby enhancing the battery performances. It should be noted that excessively large swelling resin (D) brings about excessively large gaps between the particles (D) and that between the particles (D) and other particles, so that the effect of preventing short circuit caused by the generation of lithium dendrites is reduced in some cases. Therefore, the average particle diameter of the swelling resin (D) preferably is not greater than 20 µm, more preferably is not greater than 15 µm and further preferably is not greater than 1 µm.

In the separator containing the thermal melting resin (E) melting at 80° C. to 140° C., namely, the resin having a melting temperature of 80° C. to 140° C. measured by using a differential scanning calorimeter (DSC) according to the regulations of Japanese Industrial Standards (JIS) K 7121, when the separator is exposed to 80° C. to 140° C. (or higher temperatures), the thermal melting resin (E) melts and closes the pores in the separator, so that the transfer of lithium ions is blocked, thus suppressing an abrupt discharge reaction at high temperatures. Accordingly, the shutdown temperature of the separator evaluated with the increase in the internal resistance of the model cell described above is about a temperature in the vicinity of the melting point of the thermal melting resin (E).

Specific examples of the constituent material of the thermal melting resin (E) can include polyethylene (PE), copolyolefin whose structural unit derived from ethylene is at least 85 mol %, polypropylene, polyolefin derivatives (chlorinated polyethylene, chlorinated polypropylene, etc.), polyolefin wax, oil wax, carnauba wax and the like. The above-noted copolyolefin can be, for example, ethylene-vinyl monomer copolymer, more specifically, ethylene-vinyl acetate copolymer (EVA), ethylene-methyl acrylate copolymer or ethylene-ethyl acrylate copolymer. Further, it also is possible to use polycycloolefin or the like. The thermal melting resin (E) may have only one kind of these constituent materials or two or more kinds thereof. Among them, PE, polyolefin wax or EVA whose structural unit derived from ethylene is at least 85 mol % is preferred. Also, the thermal melting resin (E) may contain as a constituent component not only the above-noted constituent materials but also various known additives to be added to resins (for example, an antioxidant or the like), as necessary.

When fine particles of the thermal melting resin (E) is used, it is recommended that the particle diameter thereof is at least 0.001 µm, more preferably at least 0.1 µm, and not greater than 15 µm, more preferably not greater than 1 µm, for example.

From the viewpoint of securing a favorable shutdown function, it is preferable that the content of the swelling resin (D) and/or the thermal melting resin (E) in the separator is 5% to 70% by volume in the total volume of the constituent components of the separator. An excessively small content of the fine particles of these resins sometimes reduces the shutdown effect produced by containing them, whereas an excessively large content thereof means less contents of the fibrous material (A) and the inorganic fine particles (B) in the separator, so that the effect secured by them sometimes becomes smaller.

Moreover, the porous layer of the thermal melting resin to be used in the separator according to the present invention can be, for example, a porous membrane formed by binding the fine particles of the thermal melting resin (E) with the binder (C) or may be a commercially-available porous film made of polyethylene, etc.

A more specific embodiment of the separator according to the present invention is embodiment (1), (2) or (3) below, for example.

The separator according to embodiment (1) includes an insulator layer obtained by using a sheet-like material formed of a group of a large number of the fibrous materials (A) alone, for example, in the form of woven fabric or nonwoven fabric (including paper), allowing the inorganic fine particles (B) and other fine particles, if necessary, to be contained in the pores of this sheet-like material, and binding the fibrous material (A), the inorganic fine particles (B), etc. mentioned above to the sheet-like material with the binder (C).

The separator according to embodiment (2) includes an insulator layer obtained by dispersing the fibrous material (A) and the inorganic fine particles (B) (and other fine particles, if necessary) uniformly and binding them with the binder (C) so as to form a sheet.

It should be noted that the separator also may have a combination of embodiment (1) and embodiment (2), namely, a form in which, in an independent sheet-like material formed of the fibrous material (A), other fibrous material and the inorganic particles (B) (and other fine particles, if necessary) are dispersed and bound with the binder (C).

The separator according to embodiment (3) is a sheet-like material obtained by layering an insulator layer formed by binding the inorganic fine particles (B) with the binder (C) on a porous layer formed by binding the fine particles of the thermal melting resin (E) with the binder (C), for example. The above-mentioned porous layer can be a commercially-available porous film. Also, the above-mentioned insulator layer may be the insulator layer in embodiment (1) or (2) above, and the above-mentioned porous layer also can contain the fibrous material (A). In other words, the porous layer of the thermal melting resin (E) may be formed on one side of an inner part of the woven fabric or the nonwoven fabric, whereas the insulator layer may be formed on the other side thereof. Furthermore, when the porous layer of the thermal melting resin (E) contains the binder (C), such a binder may be the same as or different from the binder contained in the insulator layer.

From the viewpoint of further enhancing the short-circuit prevention effect of the battery and securing the strength of the separator to achieve a favorable handling, the thickness of the separator preferably is at least 3 µm, and more preferably is at least 5 µm, for example. On the other hand, from the viewpoint of further enhancing the energy density of the battery, the thickness of the separator preferably is not greater than 30 µm, and more preferably is not greater than 20 µm.

In any of the above-described embodiments, it is desired that the porosity of the separator is, for example, at least 20%, more preferably at least 30%, and not greater than 70%, more preferably not greater than 60% in a dry state. An excessively small porosity of the separator sometimes causes a small ionic permeability, whereas an excessively large porosity sometimes leads to an insufficient strength of the separator. The porosity P (%) of the separator can be calculated by obtaining the sum of respective components i using the equation below, from the thickness, the mass per area and the density of the constituent components of the separator.

$$P=100-(\Sigma a_i \rho_i)/(m/t)$$

In the above equation, $a_i$ represents the ratio of the component i expressed by % by mass, $\rho_i$ represents the density of the component i (g/cm$^3$), m represents the mass per unit area of the separator (g/cm$^2$), and t represents the separator thickness (cm).

Furthermore, in any of the above-described embodiments, it is desired that the strength of the separator is at least 50 g in terms of a puncture strength using a needle with a diameter of 1 mm. When this puncture strength is too small, the separator may be staved in, resulting in the short circuit, in the case where lithium dendrite crystals are formed.

Also, it is desired that the separator according to the present invention has an air permeability of 10 to 300 seconds on the basis of a Gurley value, which is expressed as seconds in which 100 ml air passes through a membrane under a pressure of 0.879 g/mm$^2$ in a measurement according to JIS P 8117. An excessively large air permeability lowers the ionic permeability, whereas an excessively small air permeability reduces the strength of the separator.

As a method for manufacturing the separator according to the present invention, for example, the method (I), (II) or (III) described below can be adopted.

In method (I), a liquid composition (a slurry or the like) containing the inorganic fine particles (B) and the binder (C) is applied to an ionic permeable sheet-like material that is not deformed substantially at 150° C., or such a sheet-like material is impregnated with the above-noted liquid composition, followed by drying at a prescribed temperature.

In other words, the "sheet-like material" referred to in method (I) corresponds to sheet-like materials (various woven fabric, nonwoven fabric, etc.) formed of the fibrous material (A). Specifically, such a sheet-like material can be a porous sheet such as a woven fabric formed of at least one kind of fibrous materials made of the above-described constituent materials, a nonwoven fabric having a structure in which two or more kinds of the fibrous materials are entangled with each other, or the like. More specifically, examples thereof can include paper and nonwoven fabrics such as a PP nonwoven fabric, a polyester nonwoven fabric (a PET nonwoven fabric, a PEN nonwoven fabric, a PBT nonwoven fabric, etc.) and a PAN nonwoven fabric.

The above-noted liquid composition for forming the separator according to the present invention contains the inorganic fine particles (B) and the binder (C), and if necessary, the swelling resin (D), the thermal melting resin (E), etc. and is obtained by dispersing them in a solvent (including a dispersant; the same is true also in the following), and the binder (C) may be dissolved. The solvent used for the liquid composition is appropriate as long as it can disperse the inorganic fine particles (B), the swelling resin (D) and the thermal melting resin (E) uniformly therein and can dissolve or disperse the binder (C) uniformly therein. For example, organic solvents including aromatic hydrocarbons such as toluene; furans such as tetrahydrofuran; and ketones such as methyl ethyl ketone and methyl isobutyl ketone are preferred. Incidentally, for the purpose of controlling a surface tension, alcohol (ethylene glycol, propylene glycol or the like) or various propylene oxide-based glycol ether such as monomethyl acetate may be added suitably to the above-mentioned solvents. Further, when the binder (C) is soluble in water or used as an emulsion, water may be used as the solvent. In this case, it also is possible to control the surface tension by adding alcohols (methyl alcohol, ethyl alcohol, isopropyl alcohol, ethylene glycol, etc.) suitably.

In the above-noted liquid composition, it is preferable that a solid content including the inorganic fine particles (B), the binder (C), the swelling resin (D) and the thermal melting resin (E) is set to 10% to 40% by mass, for example.

When the above-described sheet-like material is formed of the fibrous material (A) as paper or a nonwoven fabric such as a PP nonwoven fabric or a polyester nonwoven fabric and, in particular, has pores with a relatively large opening diameter (for example, pores with an opening diameter of 5 µm or larger), this tends to cause short circuit of the battery. Thus, in this case, it is preferable that part or all of the inorganic fine particles (B) are present in the pores of the sheet-like material. Also, it is more preferable that part or all of fine particles other than the inorganic fine particles (B) [fine particles of the swelling resin (D) and the thermal melting resin (E)] are present in the pores of the sheet-like material. With such structures, the effect obtained by using the fine particles other than the inorganic fine particles (B) (the shutdown effect, etc.) is produced more effectively. In order to allow the inorganic fine particles (B), the swelling resin (D) and the thermal melting resin (E) to be present in the pores of the sheet-like material, it is appropriate to employ processes of impregnating the sheet-like material with the above-described liquid composition, and then removing an excess liquid composition through a certain gap, followed by drying. By the above-described method, it is possible to manufacture the separator according to embodiment (1).

Moreover, it also is possible to manufacture the separator according to embodiment (3) in which the porous layer of the thermal melting resin and the insulator layer containing the insulating inorganic fine particles and the binder are layered, by applying the liquid composition containing the inorganic fine particles (B) and the binder (C) and the liquid composition containing the binder (C) and the fine particles of the thermal melting resin (E) to one surface and the other surface of the sheet-like material, respectively, followed by drying.

Further, in the case where the plate-like particles are used as the inorganic fine particles (B) in the separator, in order to enhance the orientation, it is appropriate to apply shear to the liquid composition in the sheet-like material impregnated with that liquid composition. For example, in the manufacturing method (I), it is possible to apply shear to the liquid composition by the above-described method of impregnating the sheet-like material with the liquid composition and then passing it through the certain gap as the method for allowing the inorganic fine particles (B), etc. to be present in the pores of the sheet-like material. This can enhance the orientation of the inorganic fine particles (B). Alternatively, it also is possible to orient the inorganic fine particles (B) by applying a magnetic field before drying.

The method (II) for manufacturing the separator according to the present invention includes adding the fibrous material (A) to the above-mentioned liquid composition further, coating it onto a substrate such as a film or a metal foil, drying it at a prescribed temperature and peeling it off from the substrate. In other words, this is a method of performing the formation of the sheet of the fibrous material (A) and the operation of allowing the inorganic fine particles (B), etc. to be contained at the same time. By the method above, it is possible to manufacture the separator according to embodiment (2). Incidentally, the liquid composition used in method (II) is the same as the liquid composition used in method (I) except that the fibrous material (A) is essential in the composition. The amount of solids including the fibrous material (A) is preferably 10% to 40% by mass of the liquid composition, for example. Further, also in the separator obtained by method (II), it is desired that part or all of the inorganic fine particles (B) are present in the pores of the sheet-like material formed of the fibrous material (A).

The method (III) for manufacturing the separator according to the present invention includes applying the liquid composition containing the inorganic fine particles (B) and the binder (C) onto the porous membrane formed by binding the thermal melting resin (E) with the binder (C) or a commercially-available porous film, drying it at a prescribed temperature and obtaining a layered body. Also, as in the manufacturing method (II), the method may include applying the above-described liquid composition to the substrate such as a film or a metal foil, drying it at a prescribed temperature, overlaying it on the above-noted porous membrane or porous film and peeling it off from the substrate to obtain a layered body. By the above-described method, it is possible to manufacture the separator according to embodiment (3).

The separator according to the present invention is not limited to have the structures described above. For example, the inorganic fine particles (B) do not have to be present separately and may be fused partially to each other or to the fibrous material (A).

In any of the manufacturing methods (I), (II) and in order to control the hydrophobicity of the separator and secure the above-described water content, it is preferable to use the inorganic fine particles (B) whose surfaces are treated to be hydrophobic, or to remove the surfactant in the binder (C) when the binder (C) is formed of an emulsion containing the surfactant.

In order that the inorganic fine particles (B) whose surfaces are treated to be hydrophobic is contained in the separator, it may be possible to add the inorganic fine particles (B) whose surfaces are treated in advance to be hydrophobic to the above-noted liquid composition as described above, or to add untreated inorganic fine particles and a surface reforming agent to the above-noted liquid composition, thereby making the surfaces of the inorganic fine particles hydrophobic at the same time with the formation of the separator. Further, in order to use the specific binder (C) described above for the separator and remove the surfactant of that binder (C), it is preferable to treat the separator with heat so as to remove the surfactant in the binder (C) during or after drying that is performed after impregnating the sheet-like material with the above-described liquid composition prepared using the above-noted specific binder (that is not subjected to any heat treatment) or performed after applying that liquid composition on the substrate.

In the case where the thermal melting resin (E) is contained in the separator, the temperature of the heat treatment for removing the surfactant in the binder is set to be lower than the shutdown temperature of the separator. This is because, if the heat treatment is carried out at a temperature equal to or higher than the shutdown temperature, the pores in the separator are closed, and thus the battery performances are deteriorated. In the case of the separator that does not contain the thermal melting resin (E) and is provided with the shutdown property by the swelling resin (D), since the heat treatment performed in a dry state would not affect the separator characteristics as described above, the heat-treatment temperature is not particularly limited as long as it is lower than a thermal decomposition temperature of the resin. Further, also in the case of forming the insulator layer containing the insulating inorganic fine particles and the binder in advance and then integrating it with the porous layer of the thermal melting resin, the heat treatment is performed before the integration, whereby the heat-treatment temperature is not limited by the melting point of the thermal melting resin, resulting in a more effective treatment.

It is desired that the specific heat-treatment temperature is, for example, at least 70° C., more preferably at least 100° C., and not higher than 200° C., more preferably not higher than 140° C. It is desired that the heat-treatment period is, for example, at least 1 hour, more preferably at least 3 hours, and not longer than 72 hours, more preferably not longer than 24 hours. Such a heat treatment can be carried out in a warm-air circulating thermostatic chamber, for example. Further, a reduced-pressure drying using a vacuum oven also may be conducted, as necessary.

The lithium secondary battery according to the present invention is not particularly limited in terms of the configuration and structure of the negative electrode, the positive electrode, the organic electrolyte solution, etc. as long as it has the above-described separator according to the present invention, and it is possible to adopt a configuration and a structure that are known conventionally.

The lithium secondary battery can be in a tubular shape (a rectangular tubular shape or a cylindrical shape) obtained by using a steel can, an aluminum can or the like as an outer case. Further, it also is possible to form a soft package battery using a metal deposition laminate film as an outer body.

There is no particular limitation on the positive electrode as long as it is a positive electrode used for a conventionally known lithium secondary battery, namely, a positive electrode containing an active material capable of occluding and releasing Li ions. As the active material, it is possible to use, for example, a lithium-containing transition metal oxide represented by $Li_{1+x}MO_2$ ($-0.1<x<0.1$; M; Co, Ni, Mn or the like); a lithium-manganese oxide such as $LiMn_2O_4$; $LiMn_xM_{(1-x)}O_2$ obtained by substituting part of Mn in $LiMn_2O_4$ by another element; and an olivine-type $LiMPO_4$ (M: Co, Ni, Mn or Fe); $LiMn_{0.5}Ni_{0.5}O_2$; $Li_{(1+a)}Mn_xNi_yCo_{(1-x-y)}O_2$ ($-0.1<a<0.1$; $0<x<0.5$; $0<y<0.5$); or the like. A positive mixture prepared by adding a known conductive auxiliary (a carbon material such as carbon black) and a known binder such as polyvinylidene fluoride (PVDF) appropriately to these positive active materials can be made into a formed body (in other words, a positive mixture layer) using a current collector as an interlining and used.

For the positive current collector, a foil, a punched metal, a mesh, an expanded metal and the like of metal such as aluminum can be used. Usually, an aluminum foil with a thickness of 10 to 30 μm is used in a preferred manner.

A lead portion on the positive electrode side is provided usually by keeping a portion of the current collector as an exposed part without forming the positive mixture layer during the production of the positive electrode. However, the lead portion is not necessarily integrated with the current collector from the beginning, but it may be provided by connecting an aluminum foil or the like to the current collector later on.

There is no particular limitation on the negative electrode as long as it is a negative electrode used for a conventionally known lithium secondary battery, namely, a negative electrode containing an active material capable of occluding and releasing Li ions. For example, the active material can be one kind of or a mixture of two or more kinds of carbon-based materials capable of occluding and releasing lithium, such as graphite, pyrolytic carbons, cokes, glassy carbons, a calcined organic polymer compound, mesocarbon microbeads (MCMB) and carbon fibers. It also is possible to use a metal such as Si, Sn, Ge, Bi, Sb or In or an alloy thereof, compounds such as a lithium-containing nitride or a lithium-containing oxide that can be charged/discharged at a voltage as low as that of a lithium metal, a lithium metal or a lithium/aluminum alloy as the negative active material. A negative mixture prepared by adding suitably to these negative active materials a conductive auxiliary (a carbon material such as carbon black) and a binder such as PVDF is made into a formed body (a negative mixture layer) using a current collector as an interlining and used, or a foil of various alloys or lithium metals described above as it is or a formed body made by providing such a foil on the current collector is used as the negative electrode.

When the current collector is used for the negative electrode, a foil, a punched metal, a mesh, an expanded metal or the like of copper or nickel can be used for the current collector. Usually, a copper foil is used. When the entire thickness of the negative electrode is reduced for obtaining a battery with a high energy density, the upper limit of the thickness of the negative current collector is preferably 30 μm, and the lower limit thereof desirably is 5 μm.

A lead portion on the negative electrode side also is provided usually by keeping a portion of the current collector as an exposed part without forming the negative layer (including a layer having the negative active material and the negative mixture layer) during the production of the negative electrode, similarly to the lead portion on the positive electrode side. However, this lead portion on the negative electrode side is not necessarily integrated with the current collector from the beginning, but it may be provided by connecting a copper foil or the like to the current collector later on.

The electrodes can be prepared as a stack obtained by layering the above-described positive electrode and the above-described negative electrode via the separator of the present invention or as a wound electrode assembly by winding this stack further.

As the organic electrolyte solution, a nonaqueous solution prepared by dissolving a lithium salt in an organic solvent is used. The lithium salt is not limited particularly as long as it dissociates in the solvent and forms a $Li^+$ ion while causing no side reaction such as decomposition in a voltage range applied for the battery. Examples can include inorganic lithium salts such as $LiClO_4$, $LiPF_6$, $LiBF_4$, $LiAsF_6$ and $LiSbF_6$; and organic lithium salts such as $LiCF_3SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3$ ($2 \leq n \leq 7$) and $LiN(RfOSO_2)_2$ (here, Rf is a fluoroalkyl group).

The organic solvent used for the above-described electrolyte solution is not limited particularly as long as it dissolves the above-noted lithium salt and does not cause a side reaction such as decomposition in a voltage range applied for the battery. Examples include cyclic carbonates such as ethylene carbonate, propylene carbonate, butylene carbonate and vinylene carbonate; chain carbonates such as dimethyl carbonate, diethyl carbonate and methyl ethyl carbonate; chain esters such as methyl propionate; cyclic esters such as γ-butyrolactone; chain ethers such as dimethoxyethane, diethyl ether, 1,3-dioxolane, diglyme, triglyme and tetraglyme; cyclic ethers such as dioxane, tetrahydrofuran and 2-methyltetrahydrofuran; nitryls such as acetonitrile, propionitrile and methoxypropionitrile; and sulfites such as ethylene glycol sulfite. These solvents may be used alone, or two or more kinds thereof may be combined. In order to obtain a battery having more preferable performances, it is desired to use a combination of solvents that can achieve a high electrical conductivity, such as a mixed solvent of ethylene carbonate and a chain carbonate. Also, for the purpose of improving characteristics such as safety, charge-discharge cycle characteristics and high-temperature storage characteristics, it is possible to add additives such as vinylene carbonates, 1,3-propane sultone, diphenyl disulfide, cyclohexane, biphenyl, fluorobenzene and t-butylbenzene suitably to these electrolyte solutions.

The concentration of the above-mentioned lithium salt in the electrolyte solution is preferably 0.5 to 1.5 mol/d and more preferably 0.9 to 1.25 mol/d.

Further, the above-described organic solvent also can be replaced by an ambient temperature molten salt such as ethylmethylimidazolium trifluoromethylsulfonium imide, heptyltrimethylammonium trifluoromethylsulfonium imide, pyridinium trifluoromethylsulfonium imide or guazinium trifluoromethylsulfonium imide.

Moreover, by adding a polymer material that turns the above-noted organic electrolyte solution into a gel, the gelated organic electrolyte solution may be used for the battery. The polymer material for gelation of the organic electrolyte solution can be a known host polymer capable of forming a gel electrolyte, such as PVDF, PVDF-hexafluoropropylene (HFP) copolymer, PAN, polyethylene oxide, polypropylene oxide, ethylene oxide-polypropylene oxide copolymer, a cross-linked polymer having an ethylene oxide chain in its main chain or side chain, or a cross-linked poly(meth)acrylic ester.

Also, the lithium secondary battery according to the present invention is provided with the above-described separator according to the present invention, thereby making it possible to adjust the water content in the battery easily, so that a total water concentration of the electrolyte solution present in the battery can be set to be equal to or smaller than 500 ppm (on the basis of mass; regarding the water concentration of the electrolyte solution, the same applies also in the following) and preferably equal to or smaller than 400 ppm. Therefore, the lithium secondary battery according to the present invention can improve the storage characteristics and the charge-discharge cycle characteristics by preventing the degradation of these characteristics due to the water contained in the battery. In other words, as described above, the separator whose hydrophobicity is controlled by the inorganic fine particles (B) and/or the binder (C), i.e., the separator whose water content per unit volume before the battery assembly preferably is not greater than 1 $mg/cm^3$ and more preferably is not greater than 0.5 $mg/cm^3$ is provided, whereby it is possible to adjust the water content in the battery easily.

A smaller total water concentration of the electrolyte solution present in the battery is better, and 0 ppm is most preferable. However, since achieving this is difficult, the lower limit of the water concentration is usually about 100 ppm.

The total water concentration of the electrolyte solution in the battery can be calculated from a quantitative value of the amount of hydrogen fluoride (HF) by acid content measurement. Alternatively, it also may be possible to disassemble the battery in a dry box with a dew point of −60° C., take out the electrolyte solution inside and measure the total water concentration thereof by the same method as the above-described method for measuring the water content in the separator.

The lithium secondary battery according to the present invention is applicable to various purposes the same as those of conventionally known lithium secondary batteries.

Figure 2:
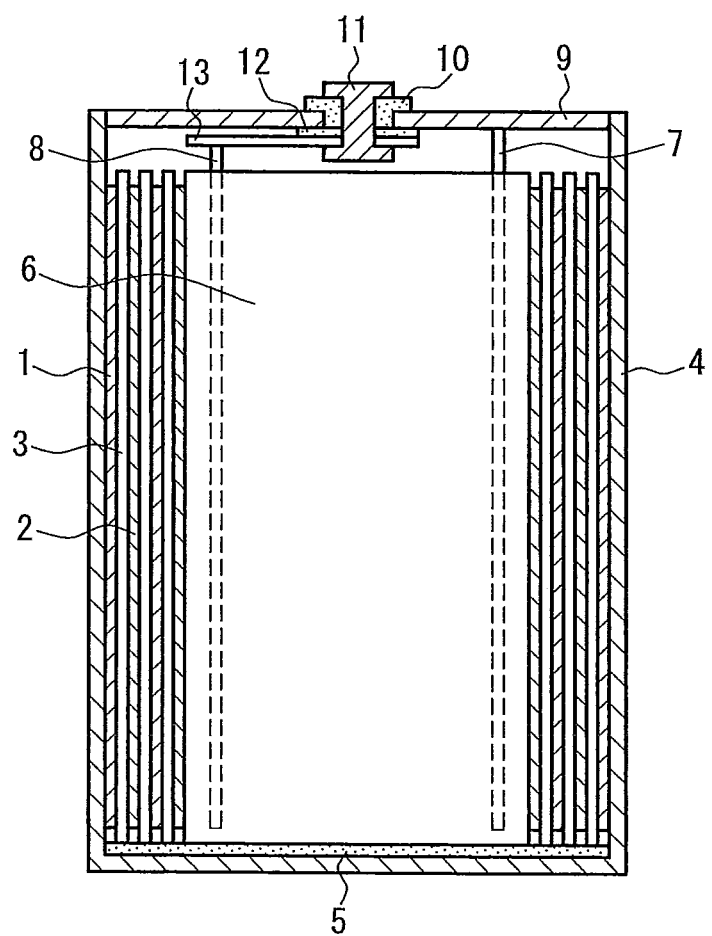
FIG. 2 is a sectional view taken along a line I-I in FIG. 1.

Now, an example of the lithium secondary battery according to the present invention will be described with reference to the accompanying drawings. FIG. 1 is a plan view schematically showing a rectangular lithium secondary battery serving as an example of the lithium secondary battery according to the present invention, and FIG. 2 is a sectional view taken along a line I-I in FIG. 1. In FIGS. 1 and 2, the same portions are assigned the same reference signs, and the redundant description sometimes will be omitted.

In FIG. 2, a positive electrode 1 and a negative electrode 2 are wound in a spiral form via a separator 3 and then compressed into a flat form so as to obtain an electrode laminate 6 with a flat spiral structure, which is then received in a rectangular battery case 4 together with an electrolyte solution. It should be noted that, for avoiding complication, FIG. 2 does not show metal foils as current collectors used for producing the positive electrode 1 and the negative electrode 2 or the electrolyte solution. Also, in FIG. 2, the cross-section of central portions of the separator 3 and the electrode laminate 6 is not shown.

The battery case 4 is formed of an aluminum alloy or the like and serves as an outer material of the battery, and this battery case 4 also functions as a positive electrode terminal. Further, at the bottom of the battery case 4, an insulator 5 formed of a polytetrafluoroethylene sheet or the like is disposed. A positive electrode lead 7 and a negative electrode lead 8 respectively connected to one end of the positive electrode 1 and one end of the negative electrode 2 are led out from the electrode laminate 6 with a flat spiral structure constituted by the positive electrode 1, the negative electrode 2 and the separator 3. Further, a terminal 11 formed of a stainless steel or the like is attached to a lid plate 9 that seals an opening of the battery case 4 and is formed of an aluminum alloy or the like via an insulating packing 10 formed of polypropylene or the like. A lead plate 13 formed of a stainless steel or the like is attached to this terminal 11 via an insulator 12. Moreover, this lid plate 9 is inserted in the opening of the battery case 4, and by welding a joint portion between the lid plate 9 and the battery case 4, the opening of the battery case 4 is sealed, so that the inside of the battery is enclosed. Additionally, the above-described separator for a battery according to the present invention is used as the separator 3.

In the following, the present invention will be described in detail by way of examples.

Example 1

Fine particles obtained by treating surfaces of plate-like boehmite (with a mean particle diameter of 1 μm and an aspect ratio of 10) to be hydrophobic using methyltriethoxysilane ["SZ6072 (trade name)" manufactured by Dow Corning Toray Company, Limited] serving as a surface treating agent by the following method were used as the inorganic fine particles (B). 10 g of the above-noted surface treating agent was dropped into 1000 g of water with a pH 4, followed by stirring for 1 hour. A slurry made of 1000 g of plate-like boehmite and 1000 g of water was added to this surface treating agent solution while stirring, and then stirred for 60 minutes. Thereafter, fine particles were separated by sedimentation with the solution standing still. The fine particles were dried at 120° C. under a reduced pressure for 15 hours, thereby obtaining the inorganic fine particles (B) whose surfaces were treated to be hydrophobic.

A slurry was obtained by adding 1000 g of water to 1000 g of the inorganic fine particles (B) described above. 600 g of SBR latex (with a solids ratio of 3% by mass) serving as the binder (C) formed of an emulsion containing a surfactant was added to this slurry and dispersed by stirring with Three-One Motor for 1 hour, thus obtaining a uniform slurry. A PET nonwoven fabric with a thickness of 15 μm was introduced into this slurry, pulled out for applying the slurry to the nonwoven fabric and then passed between a gap with a prescribed spacing. Subsequently, the nonwoven fabric was dried at 60° C. under a reduced pressure for 15 hours, thus obtaining a separator with a thickness of 20 μm.

In the separator of Example 1, when the specific gravity of the inorganic fine particles (B) was 3 g/cm$^3$, that of the binder was 1 g/cm$^3$ and that of PET in the PET nonwoven fabric was 1.38 g/cm$^3$, the volume content of the inorganic fine particles (B) was calculated as 43.5%.

Example 2

The inorganic fine particles (B) whose surfaces were treated to be hydrophobic were produced similarly to Example 1 except for using "AV43-206M (trade name)" manufactured by Dow Corning Toray Company, Limited as the surface reforming agent, and the separator was produced similarly to Example 1 except for using these inorganic fine particles (B).

In the separator of Example 2, when the specific gravity of the inorganic fine particles (B) was 3 g/cm$^3$, that of the binder was 1 g/cm$^3$ and that of PET in the PET nonwoven fabric was 1.38 g/cm$^3$, the volume content of the inorganic fine particles (B) was calculated as 43.5%.

Example 3

The inorganic fine particles (B) whose surfaces were treated to be hydrophobic were produced similarly to Example 1 except for using "AV43-210MC (trade name)" manufactured by Dow Corning Toray Company, Limited as the surface reforming agent, and the separator was produced similarly to Example 1 except for using these inorganic fine particles (B).

In the separator of Example 3, when the specific gravity of the inorganic fine particles (B) was 3 g/cm$^3$, that of the binder was 1 g/cm$^3$ and that of PET in the PET nonwoven fabric was 1.38 g/cm$^3$, the volume content of the inorganic fine particles (B) was calculated as 43.5%.

Example 4

The inorganic fine particles (B) whose surfaces were treated to be hydrophobic were produced similarly to Example 1 except for using hexamethyldisilazane "HDMS3 (trade name)" manufactured by Shin-Etsu Chemical Co., Ltd. as the surface reforming agent, and the separator was produced similarly to Example 1 except for using these inorganic fine particles (B).

In the separator of Example 4, when the specific gravity of the inorganic fine particles (B) was 3 g/cm$^3$, that of the binder was 1 g/cm³ and that of PET in the PET nonwoven fabric was 1.38 g/cm³, the volume content of the inorganic fine particles (B) was calculated as 43.5%.

Example 5

The separator was produced similarly to Example 1 except for using the same plate-like boehmite as that used in Example 1 without treating their surfaces to be hydrophobic as the inorganic fine particles (B). Thereafter, this separator was treated with heat at 120° C. for 15 hours, thereby removing the surfactant in SBR, which served as the binder (C).

In the separator of Example 5, when the specific gravity of the inorganic fine particles (B) was 3 g/cm³, that of the binder was 1 g/cm³ and that of PET in the PET nonwoven fabric was 1.38 g/cm³, the volume content of the inorganic fine particles (B) was calculated as 44%.

Example 6

The separator was produced similarly to Example 1 except for using the same plate-like boehmite as that used in Example 1 without treating their surfaces to be hydrophobic as the inorganic fine particles (B). After the production, this separator was treated with heat at 120° C. under a reduced pressure for 15 hours, thereby removing the surfactant.

In the separator of Example 6, when the specific gravity of the inorganic fine particles (B) was 3 g/cm³, that of the binder was 1 g/cm³ and that of PET in the PET nonwoven fabric was 1.38 g/cm³, the volume content of the inorganic fine particles (B) was calculated as 44%.

Comparative Example 1

The separator was produced similarly to Example 1 except for using the same plate-like boehmite as that used in Example 1 without treating their surfaces to be hydrophobic as the inorganic fine particles (B).

<Moisture Absorption Property of Separator>

Each of the separators of Examples 1 to 6, the separator of Comparative example 1 and a 20 μm thick PE microporous film, which was a conventionally known separator serving as Comparative example 2, was cut into a piece 47 mm in wide and 20 mm in length (the separator of Comparative example 2 was dried at 60° C. under a reduced pressure for 15 hours), and then allowed to stand still in a thermo-hygrostat at a temperature of 20° C. and at a relative humidity of 60% for 24 hours. The water content in each separator immediately after the production (before storage) and that after storage in the above-described atmosphere were measured using a trace water measuring device "AQ7" and a water evaporator "EV6" manufactured by Hiranuma Sangyo Co., Ltd. as follows.

The water evaporator in which a nitrogen gas was flowed was placed in a heating furnace and kept at 150° C. A measurement sample was placed in that water evaporator and held for 1 minute, the nitrogen gas that has been flowed was introduced in a measurement cell of the trace water measuring device, and the amount of water taken out from the measurement sample in the water evaporator was measured. Incidentally, in order to prevent entry of water from outside, the water amount was measured in a glove box with a dew point of −60° C. or lower.

Table 1 shows the water content per unit volume of each separator calculated from the water amount obtained by the above-described measurement.

TABLE 1

| | Water content in separator (mg/cm³) | |
| --- | --- | --- |
| | Before storage | After storage |
| Example 1 | 0.3 | 1 |
| Example 2 | 0.3 | 0.5 |
| Example 3 | 0.3 | 0.3 |
| Example 4 | 0.3 | 0.3 |
| Example 5 | 0.3 | 0.3 |
| Example 6 | 0.3 | 0.3 |
| Comp. example 1 | 1.5 | 3 |
| Comp. example 2 | 0.1 | 0.1 |

Since the drying temperature of the slurry containing the inorganic fine particles (B) and the emulsion of the binder (C) was low, the surfactant remained in the separators of Examples 1 to 4 and the separator of Comparative example 1. However, as becomes clear from Table 1, since the inorganic fine particles (B) whose surfaces were treated to be hydrophobic with the surface treating agent were used in the separators of Examples 1 to 4, it was possible to reduce the influence of the remaining surfactant. Thus, the separators of Examples 1 to 4 achieved a reduced water content after storage (after they were allowed to stand still in the thermo-hygrostat at a temperature of 20° C. and at a relative humidity of 60% for 24 hours) compared with the separator of Comparative example 1. Further, although the inorganic fine particles (B) whose surfaces were not treated to be hydrophobic were used in the separators of Examples 5 and 6 similarly to Comparative example 1, the surfactant was removed by the heat treatment, so that it was possible to reduce the water content after storage similarly to Examples 1 to 4.

Example 7

Production of Positive Electrode 85 parts by mass of LiCoO2 serving as the positive active material, 10 parts by mass of acetylene black serving as the conductive auxiliary and 5 parts by mass of PVDF serving as the binder were mixed with N-methyl-2-pyrrolidone (NMP) as the solvent until the mixture was homogeneous, thereby preparing a paste containing a positive mixture. This paste was applied intermittently to both surfaces of a 15 μm thick aluminum foil serving as the current collector such that the length of the applied active material was 320 mm on the front surface and 250 mm on the back surface, followed by drying. Thereafter, calendering was carried out for adjusting the thickness of the positive mixture layer so that the entire thickness was 150 which was then cut to be 43 mm in width, thereby producing a positive electrode 340 mm in length and 43 mm in width. Further, an aluminum tab was connected to an exposed part of the aluminum foil of this positive electrode.

<Production of Negative Electrode>

90 parts by mass of graphite serving as the negative active material, 5 parts by mass of PVDF serving as the binder were mixed with NMP as the solvent until the mixture was homogeneous, thereby preparing a paste containing a negative mixture. This paste containing the negative mixture was applied intermittently to both surfaces of a 10 μm thick copper foil serving as the current collector such that the length of the applied active material was 20 mm on the front surface and 260 mm on the back surface, followed by drying. Thereafter, calendering was carried out for adjusting the thickness of the negative mixture layer so that the entire thickness was 142

μm, which was then cut to be 45 mm in width, thereby producing a negative electrode 330 mm in length and 45 mm in width. Further, a copper tab was connected to an exposed part of the copper foil of this negative electrode.

<Assembly of Battery>

The positive electrode and the negative electrode that were obtained as described above were layered via the separator of Example 1 and wound in a spiral form to obtain a wound electrode assembly. This wound electrode assembly was compressed into a flat form and inserted in a rectangular battery case with a thickness of 4.2 mm and a width of 34 mm. The electrolyte solution (a solution obtained by dissolving $LiPF_6$ to be a concentration of 1.2 mold in a mixture solvent of ethylene carbonate and ethyl methyl carbonate at a volume ratio of 1:2) was poured, and the opening of the battery case was sealed, thus producing a lithium secondary battery. In a preliminary charging process (formation charging) after the electrode assembly, a constant current charging at 150 mA up to 4.2 V and a subsequent constant voltage charging at 4.2 V were carried out for 6 hours in total so as to achieve an electric quantity corresponding to 20% of 750 mAh, which was the rated capacity of the battery. Thereafter, a constant current discharging at 150 mA was carried out down to 3 V.

Examples 8 to 12 and Comparative Examples 3 and 4

Lithium secondary batteries were produced similarly to Example 7 except that their separators were changed to the separators produced in Examples 2 to 6 and Comparative examples 1 and 2, respectively, and then the preliminary charging and the constant current discharging were carried out.

Next, the lithium secondary batteries of Examples 7 to 12 and Comparative examples 3 and 4 were evaluated as follows.

<Total Water Concentration of Electrolyte Solution and Increased Water Concentration of Electrolyte Solution due to Separator>

Each of the batteries of Examples 7 to 12 and Comparative examples 3 and 4 was disassembled in a dry box with a dew point of −60° C., the electrolyte solution was taken out by centrifugation, and the water concentration thereof was measured using the trace water measuring device "AQ7" manufactured by Hiranuma Sangyo Co., Ltd. Also, the increased water concentration of the electrolyte solution due to the separator (the water concentration attributed to the separator) was obtained as follows: each battery was disassembled before being supplied with the electrolyte solution in a dry box with a dew point of −60° C., the separator was taken out, the water content in the separator was measured by a method similar to the above, and the water concentration was calculated by the equation below. Table 2 shows these results.

$$C = 10^6 \times (M \times S_1/S_2)/W$$

In the above equation, C is the increased water concentration (ppm) of the electrolyte solution due to the separator, M is a water amount (g) obtained for a measurement sample of the separator, $S_1$ is an area ($mm^2$) of the separator in the battery, $S_2$ is an area ($mm^2$) of the measurement sample of the separator, and W is a weight (mg) of the electrolyte solution in the battery.

<Storage Characteristics Test>

For each of the batteries of Examples 7 to 12 and Comparative examples 3 and 4, another battery different from that used for measuring the total water concentration of the electrolyte solution was prepared, subjected to five times of repeated charging and discharging under the same conditions as the preliminary charging and the subsequent constant current discharging described above, and then charged at a constant current and a constant voltage under the same condition as the preliminary charging. Next, the thickness of the battery was measured. Then, the battery was placed in a thermostatic chamber at 85° C., stored for 24 hours and taken out, and the thickness of the battery was measured. Table 3 shows the result thereof.

<Charge-Discharge Cycle Characteristics Test>

The batteries of Examples 7 to 12 and Comparative examples 3 and 4 that had not been subjected to any evaluations were prepared and subjected to 50 cycles of repeated charging and discharging in a thermostatic chamber at 45° C. under the same condition as the preliminary charging and the subsequent constant current discharging described above, and the ratio of the discharge capacity at the 50th cycle to the charge capacity (the charge-discharge efficiency) was determined. Table 3 shows the results thereof.

<Reliability Test>

The batteries of Examples 7 to 12 and Comparative examples 3 and 4 that had not been subjected to any evaluations were prepared, charged at a constant current and a constant voltage under the same condition as the preliminary charging described above, placed in a thermostatic chamber, heated from room temperature to 150° C. at 5° C./min, and then stored at 150° C. for 60 minutes, along which the time until the short circuit of the battery occurred was measured. Table 3 shows the results thereof.

TABLE 2

| | Water concentration of electrolyte solution (ppm) | |
|---|---|---|
| | Water concentration attributed to separator | Total water concentration |
| Example 7 | 179 | 479 |
| Example 8 | 170 | 470 |
| Example 9 | 159 | 459 |
| Example 10 | 120 | 420 |
| Example 11 | 100 | 400 |
| Example 12 | 95 | 395 |
| Comp. example 3 | 914 | 1214 |
| Comp. example 4 | 50 | 350 |

TABLE 3

| | Battery thickness (mm) | | Charge-discharge efficiency after cycle test (%) | Result of reliability test |
|---|---|---|---|---|
| | Before storage | After storage | | |
| Example 7 | 4.4 | 6.1 | 93.0 | No short circuit |
| Example 8 | 4.3 | 6.0 | 96.0 | No short circuit |
| Example 9 | 4.3 | 6.0 | 97.0 | No short circuit |
| Example 10 | 4.3 | 6.0 | 97.5 | No short circuit |
| Example 11 | 4.3 | 6.0 | 98.3 | No short circuit |
| Example 12 | 4.3 | 6.0 | 98.5 | No short circuit |
| Comp. example 3 | 5.8 | 6.7 | 91.0 | No short circuit |
| Comp. example 4 | 4.3 | 6.0 | 99.0 | Short circuit after 12 minutes |

As becomes clear from Table 2, in the lithium secondary batteries of Examples 7 to 12 using the separators of Examples 1 to 6 whose hydrophobicity was controlled, the increased water concentration due to the separator was reduced, thus suppressing the total water concentration of the electrolyte solution to not greater than 500 ppm, whereas, in the lithium secondary battery of Comparative example 3 using the separator of Comparative example 1 whose hydrophobicity was not controlled, the water concentration of the electrolyte solution increased by the separator was high and the total water concentration of the electrolyte solution exceeded 500 ppm.

Also, as shown in Table 3, the thickness of the lithium secondary batteries of Examples 7 to 12 was small after storage, and charge-discharge efficiency at the 50th cycle of the charging and discharging at 45° C. was favorable, whereas the thickness of the battery of Comparative example 3 with a high total water concentration of the electrolyte solution was large after storage, and charge-discharge efficiency at the 50th cycle of the charging and discharging at 45° C. was lower. This is considered to be because, since the battery thickness increased due to hydrogen fluoride (HF) and hydrogen generated by the reaction between $LiPF_6$ and water in the electrolyte solution and the local current concentration resulting from nonuniform charge-discharge reaction on the electrode surface due to gas generation caused the deposition of minute lithium dendrites, leading to the slight short circuit, the charge-discharge efficiency at the 50th cycle of the charging and discharging at 45° C. decreased.

Furthermore, in the reliability test, the batteries of Examples 7 to 12 did not show any changes even after storage for 60 minutes under a very severe condition at 150° C., and thus they had an excellent safety. In contrast, the battery of Comparative example 4 corresponding to a conventional battery lost its function within a relatively short period at 150° C.

Example 13

The same slurry as that used in Example 1 was applied to a silicone coated polyester film substrate and dried, and thereby an insulator layer with a thickness of 4 μm was formed. Next, the above-noted insulator layer was overlaid on a PE microporous film with a thickness of 16 μm that had been dried at 60° C. under a reduced pressure for 15 hours, and the substrate was peeled off, and thus a separator including the porous layer of a thermal melting resin and the insulator layer containing the inorganic fine particles and the binder was formed. When the moisture absorption property of this separator was measured by a method similar to the above, the water content per unit volume before the storage and that after the storage test were both 0.1 $mg/cm^3$, showing that it was possible to suppress the moisture absorption property as low as that of a commercially-available porous film made of thermal melting resin.

The invention may be embodied in other forms without departing from the spirit or essential characteristics thereof. The embodiments disclosed in this application are to be considered in all respects as illustrative and not restrictive. The scope of the invention is indicated by the appended claims rather than by the foregoing description, and all changes that come within the meaning and range of equivalency of the claims are intended to be embraced therein.

INDUSTRIAL APPLICABILITY

As described above, the present invention can provide a lithium secondary battery that has favorable reliability and safety and is excellent in storage characteristics and charge-discharge cycle characteristics, and the lithium secondary battery according to the present invention can be used widely as a power source in various kinds of portable equipment.

The invention claimed is:

1. A separator for a battery, comprising:
   a porous film formed of a thermal melting resin; and
   an insulator layer formed of insulating inorganic fine particles and a binder,
   wherein the separator has the insulator layer on the porous film,
   the thermal melting resin includes at least one selected from the group consisting of polyethylene, copolyolefin whose structural unit derived from ethylene is at least 85 mol %, and polypropylene,
   the separator has a porosity in a range of 20% to 70%,
   the separator has a thickness of 3 μm or more and 20 μM or less, and
   water content per unit volume is equal to or smaller than 1 $mg/cm^3$ when the separator is held for 24 hours in an atmosphere with a relative humidity of 60% at 20° C.

2. The separator for a battery according to claim 1, wherein the inorganic fine particles have an average particle diameter larger than 1/100 of a thickness of the separator.

3. The separator for a battery according to claim 1, wherein surfaces of the inorganic fine particles are treated to be hydrophobic.

4. The separator for a battery according to claim 3, wherein the surfaces of the inorganic fine particles are treated to be hydrophobic with at least one kind of a surface reforming agent selected from the group consisting of silazane, a silane coupling agent, a silicone oil, a titanate coupling agent, an aluminate coupling agent and a zirconate coupling agent.

5. The separator for a battery according to claim 1, wherein the inorganic fine particles are silica, alumina or boehmite treated with heat.

6. The separator for a battery according to claim 1, wherein the inorganic fine particles comprise platy particles.

7. The separator for a battery according to claim 1, wherein surfaces of the inorganic fine particles are heat-treated to be hydrophobic.

8. The separator for a battery according to claim 1, wherein the thermal melting resin has a melting temperature of 80° C. to 140° C.

9. The separator for a battery according to claim 1, wherein the inorganic fine particles have an average particle diameter in a range of 0.1 μm to 5 μm.

10. The separator for a battery according to claim 1, wherein the amount of the inorganic fine particles contained in the separator is in a range of 20% to 70% by volume in a total volume of the constituent components of the separator.

11. The separator for a battery according to claim 1, wherein the inorganic fine particles are oxide.

12. The separator for a battery according to claim 1, wherein the separator has an air permeability of 10 to 300 seconds on the basis of a Gurley value.

13. The separator for a battery according to claim 1, wherein the water content is equal to or smaller than 0.5 $mg/cm^3$.

14. A lithium secondary battery comprising:
   a negative electrode;
   a positive electrode;
   an organic electrolyte solution; and
   the separator for a battery according to claim 1.

15. The separator for a battery according to claim 1, wherein the binder includes at least one selected from the group consisting of an ethylene-vinyl acetate copolymer with a structural unit derived from vinyl acetate of 20 to 35 mol %, an ethylene-acrylate copolymer, a cross-linked substance of polyacrylate, a fluorine-based rubber, a styrene-butadiene rubber, carboxymethyl cellulose, hydroxyethyl cellulose, polyvinyl alcohol, polyvinyl butyral, polyvinyl pyrrolidone, polyurethane, and an epoxy resin.

16. A lithium secondary battery comprising a negative electrode, a positive electrode, an organic electrolyte solution, and a separator for a battery,
wherein the separator comprises a porous film formed of a thermal melting resin, and an insulator layer formed of insulating inorganic fine particles and a binder,
the separator has the insulator layer on the porous film,
the thermal melting resin includes at least one selected from the group consisting of polyethylene, copolyolefin whose structural unit derived from ethylene is at least 85 mol %, and polypropylene,
the separator has a porosity in a range of 20% to 70%,
the organic electrolyte solution is a nonaqueous solution containing an organic solvent and a lithium salt, and
a total water concentration of the organic electrolyte solution is equal to or lower than 500 ppm.

17. The lithium secondary battery according to claim 16, wherein surfaces of the inorganic fine particles are treated to be hydrophobic.

18. The lithium secondary battery according to claim 17, wherein the surfaces of the inorganic fine particles are treated to be hydrophobic with at least one kind of a surface reforming agent selected from the group consisting of silazane, a silane coupling agent, a silicone oil, a titanate coupling agent, an aluminate coupling agent and a zirconate coupling agent.

19. The lithium secondary battery according to claim 16, wherein the inorganic fine particles are silica, alumina or boehmite treated with heat.

20. The lithium secondary battery according to claim 16, wherein the inorganic fine particles comprise platy particles.

21. The lithium secondary battery according to claim 16, wherein surfaces of the inorganic fine particles are heat-treated to be hydrophobic.

22. The lithium secondary battery according to claim 16, wherein the thermal melting resin has a melting temperature of 80° C. to 140° C.

23. The lithium secondary battery according to claim 16, wherein the inorganic fine particles have an average particle diameter in a range of 0.1 μm to 5 μm.

24. The lithium secondary battery according to claim 16, wherein the separator has a thickness of 3 μm or more and 20 μm or less.

25. The lithium secondary battery according to claim 16, wherein the amount of the inorganic fine particles contained in the separator is in a range of 20% to 70% by volume in a total volume of the constituent components of the separator.

26. The lithium secondary battery according to claim 16, wherein the inorganic fine particles are oxide.

27. The lithium secondary battery according to claim 16, wherein the separator has an air permeability of 10 to 300 seconds on the basis of a Gurley value.

28. The lithium secondary battery according to claim 16, wherein the binder includes at least one selected from the group consisting of an ethylene-vinyl acetate copolymer with a structural unit derived from vinyl acetate of 20 to 35 mol %, an ethylene-acrylate copolymer, a cross-linked substance of polyacrylate, a fluorine-based rubber, a styrene-butadiene rubber, carboxymethyl cellulose, hydroxyethyl cellulose, polyvinyl alcohol, polyvinyl butyral, polyvinyl pyrrolidone, polyurethane, and an epoxy resin.

29. The lithium secondary battery according to claim 16, wherein the inorganic fine particles have an average particle diameter larger than 1/100 of a thickness of the separator.

\* \* \* \* \*